United States Patent [19]

Eblen et al.

[11] Patent Number: 5,072,706
[45] Date of Patent: Dec. 17, 1991

[54] FUEL INJECTION PUMP FOR INTERNAL COMBUSTION ENGINES, IN PARTICULAR DIESEL ENGINES

[75] Inventors: Ewald Eblen, Stuttgart; Karl Hofmann, Remseck; Alfred Schmitt, Ditzingen; Max Straubel; Hung Truong-Canh, both of Stuttgart, all of Fed. Rep. of Germany

[73] Assignee: Robert Bosch GmbH, Stuttgart, Fed. Rep. of Germany

[21] Appl. No.: 542,808

Related U.S. Application Data

[63] Continuation of Ser. No. 221,462, filed as PCT/DE87/00410, Sep. 11, 1987, published as WO88/02814, Apr. 21, 1988, abandoned.

[30] Foreign Application Priority Data

Oct. 14, 1986 [DE] Fed. Rep. of Germany ....... 3634962

[51] Int. Cl.$^5$ ............................................. F02M 45/00
[52] U.S. Cl. ..................................... 123/297; 123/300
[58] Field of Search ............................. 123/299, 300

[56] References Cited

U.S. PATENT DOCUMENTS

| | | | |
|---|---|---|---|
| 4,033,301 | 7/1977 | Walton | 123/300 |
| 4,590,904 | 5/1986 | Wannenwetsch | 123/300 |
| 4,831,982 | 5/1989 | Baranescu | 123/300 |

FOREIGN PATENT DOCUMENTS

| | | |
|---|---|---|
| 2721628 | 12/1977 | Fed. Rep. of Germany . |
| 7433013 | 5/1975 | France . |
| 480326 | 4/1953 | Italy ..................... 123/299 |
| 56-4454 | 4/1981 | Japan . |
| 57-168027 | 10/1982 | Japan . |
| 1293155 | 10/1972 | United Kingdom . |

Primary Examiner—Andrew M. Dolinar
Assistant Examiner—M. Macy
Attorney, Agent, or Firm—Michael J. Striker

[57] ABSTRACT

A fuel injection arrangement for internal combustion engines, particularly for diesel engines, is indicated, in which the fuel injection is divided into an advance injection and a main injection for the purpose of noise reduction. An advance injection unit (27) is provided for the purpose of proportioning the advance injection quantity and a fuel injection pump of a conventional construction is provided for proportioning the main injection quantity. For an optimal design of the advance injection quantity with respect to noise reduction without influencing the main injection quantity, the advance injection unit (27) comprises a high-pressure storage (28), which is compressed to injection pressure, and at least one solenoid valve (30), which is controlled with respect to time. The advance and main injections are preferably effected via separate nozzle cross sections (21, 22).

13 Claims, 2 Drawing Sheets

FUEL INJECTION PUMP FOR INTERNAL COMBUSTION ENGINES, IN PARTICULAR DIESEL ENGINES

This application is a continuation of application Ser. No. 221,462, filed as PCT/DE87/00410 Sep. 11, 1987, published as WO88/02814, Apr. 21, 1988, now abandoned.

BACKGROUND OF THE INVENTION

The invention is based on a fuel injection arrangement for internal combustion engines, particularly for diesel engines.

In diesel engines with direct injection, considerable noise problems arise because of the sudden combustion. A noticeable reduction in noise can nevertheless be achieved by means of dividing the fuel injection quantity into a smaller advance injection quantity and a main injection quantity which depends on the speed and the load of the diesel engine. Therefore, in order to divide up the injection quantity a separate advance injection unit is provided in addition to the fuel injection pump, which separate advance injection unit feeds an advance injection quantity to the injection nozzle.

In a known fuel injection arrangement for combustion engines (DE-OS 27 21 628), the advance injection unit comprises an advance injection pump which is provided with a piezoelectric drive. The piezoelectric drive is excited by a control circuit which in turn receives a signal from a rotating part of the internal combustion engine, e.g. from the crankshaft, which signal is a function of the angle of rotation. The fuel injection pump, which has a conventional construction, is driven in synchronization with the internal combustion engine. The advance injection pump comprises a plunger which is axially displaceable in a cylinder which is connected with the fuel line between the fuel injection pump and the injection nozzle. When the piezoelectric drive is excited, it moves the plunger to the smallest cylinder volume, possibly by means of a hydraulic transmission. Accordingly, fuel is displaced from the cylinder and effects an opening of the injection nozzle through which the advance injection quantity exits At the end of the plunger stroke the piezoelectric drive remains excited so that the fuel delivered by the fuel injection pump now keeps the injection nozzle open or opens it again and the main injection quantity can accordingly exit through the opened injection nozzle. Toward the end of the delivery stroke of the fuel injection pump the piezoelectric drive is de-energized so that the plunger is moved back into the position with the greatest cylinder volume. The volume of the fuel line is accordingly increased in a sudden manner. The pressure in the fuel line and in the injection nozzle accordingly falls suddenly and closes the injection nozzle.

In this construction of the advance injection unit, the advance injection quantity is determined by means of the stroke of the plunger and fixed unalterably with respect to construction. Only the timing of the advance injection can be controlled. Accordingly, an optimum design of the advance injection with respect to maximum noise reduction is not possible because of the lack of adjustment possibilities. Moreover, the timing of the advance injection can also not be altered without influencing the main injection, since the latter is always effected immediately after the advance injection is terminated.

SUMMARY OF THE INVENTION

The fuel injection arrangement, according to the invention has the advantage that the hydraulic circuits for the main and advance injections are completely separated from one another and accordingly the advance injection in no way influences the main injection. The advance injection quantity can be adjusted within broad limits by means of the timed-control of the solenoid valve. Both together enable an optimum design of the advance injection with respect to noise reduction without disadvantages with respect to consumption and exhaust gas. The assignment of the advance injection to the main injection can be freely selected so that the characteristic values, such as the start of injection and the injection quantity, can be arranged in characteristic diagrams. The required volume of the high-pressure storage is correspondingly small because of the separation of the advance injection from the main injection, which is still conventional, so that the capacity requirement of the pump for the storage pressure supply is also low.

The separate nozzle cross sections, which can be realized e.g. by means of a double-needle nozzle, facilitate the optimum design of the advance injection without tolerating disadvantages in the main injection.

Conventional injection nozzles can be used in these embodiment forms. From additional embodiment forms there follow the additional advantages that the line lengths between the high-pressure storage and the solenoid valve are not critical, that the compression waves which form when the injection nozzles close possess a favorable behavior with respect to extinction of oscillation, and that no fuel control is effected in the direction of the fuel return line by means of the solenoid valve.

Further embodiment forms of the invention, show further possibilities of fuel injection arrangements which, however, require a special construction of the advance injection nozzles. In these injection nozzles, the injection nozzle is kept closed by means of pressure on the back of the nozzle needle. The nozzle cross sections can be opened by means of controlling the closing pressure.

BRIEF DESCRIPTION OF THE DRAWINGS

The invention is explained in more detail in the following description with the embodiment examples shown in the drawing. Shown in a schematic manner are.

DETAILED DESCRIPTION OF THE PREFERRED EXAMPLES

Figure 1:
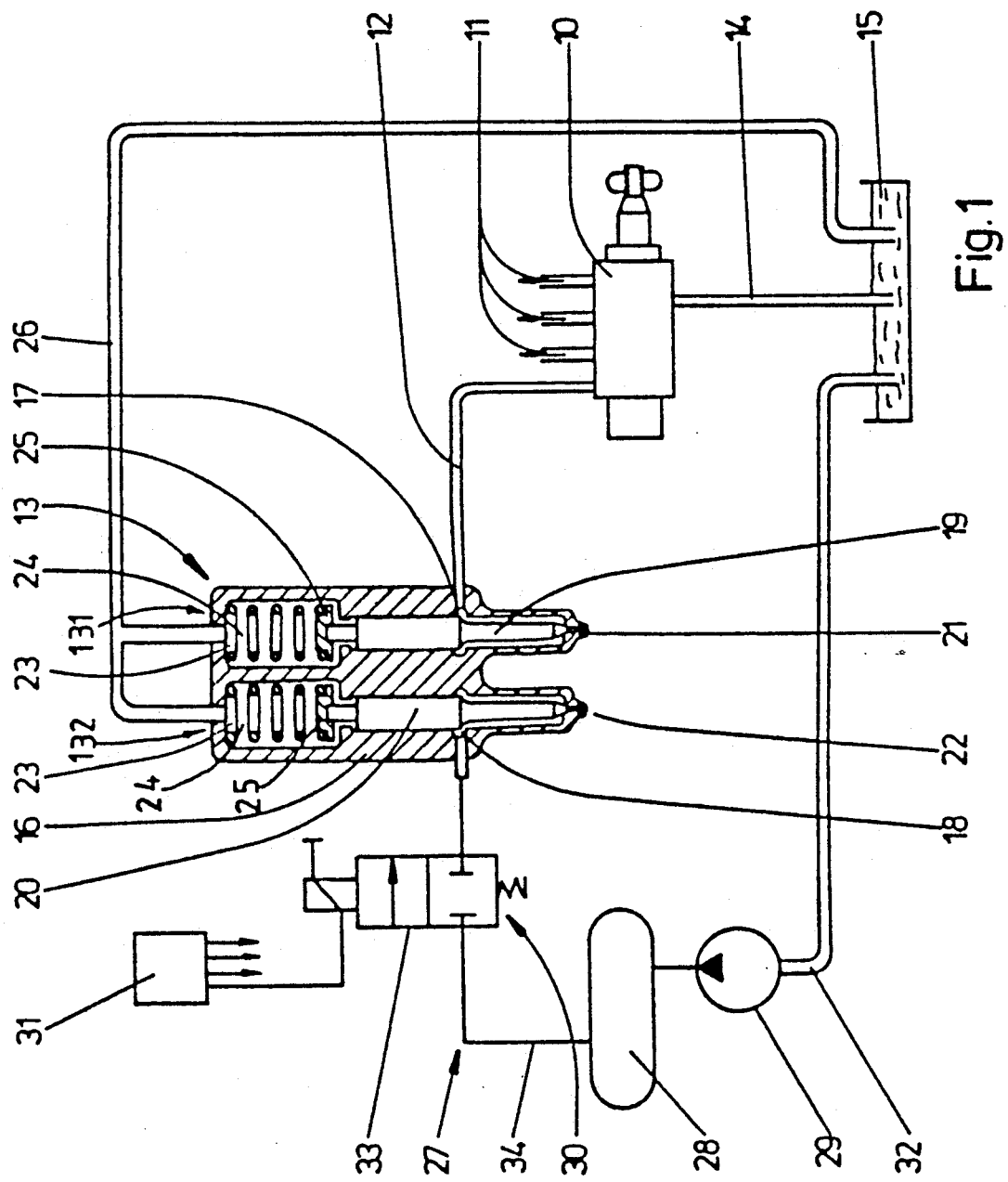
FIG. 1 shows a schematic of a fuel injection arrangement for a diesel engine.

The fuel injection arrangement for a four-cylinder diesel engine, shown in a schematic manner in FIG. 1 as an example of a combustion engine, comprises an injection pump 10 with four pressure line connections 11 which are connected in each instance with an injection nozzle 13 assigned to a cylinder via fuel lines 12. For the sake of clarity, only one injection nozzle 13 is shown for one cylinder of the diesel engine in FIG. 1. In a four-cylinder diesel engine there are four injection nozzles 13 which are connected with the fuel injection pump 10 via a fuel line 12. The fuel injection pump 10, which is connected with a fuel tank 15 on the input side via an intake line 14, is driven in synchronization with the diesel engine and can be constructed as an in-line or distributor injection pump. The injection nozzle 13, which is divided into a main injection pump 131 and an advance injection nozzle 132, is a so-called double-needle nozzle which comprises a nozzle holder 16 with two injection chambers 17, 18 and two nozzle needles 19, 20. Each injection chamber 17, 18 comprises an injection opening 21 and 22 which is closed or opened by the assigned nozzle needle 19 and 20. The cross section of the injection openings is variously constructed, wherein the smaller cross section is assigned to the advance injection nozzle 132. The nozzle needles 19, 20, which are axially movable in the nozzle holder 16, are constructed in such a way that they are acted upon in the opening direction by the pressure in the injection chambers 17, 18. A closing force, which loads the nozzle needles 19, 20 in the closing direction, acts on the back of the two nozzle needles 19, 20. The closing force is produced by closing springs 23, each of which is accommodated in a spring space 24 of the nozzle holder 16 and supported at the nozzle holder 16 on the one hand and on the back of the two nozzle needles 19, 20 by means of a thrust pin 25 on the other hand. The spring spaces 24 are connected with the fuel tank 15 via a fuel return line 26 for the purpose of returning fuel leakage quantities. The fuel line 12 coming from the fuel injection pump 10 opens into the injection chamber 17 of the main injection nozzle 131, while the injection chamber 18 of the advance injection nozzle 132 is connected with an advance injection unit 27.

The advance injection unit 27 consists of a high-pressure storage 28, which is compressed to injection pressure with fuel by means of a fuel delivery pump 29, and of four solenoid valves 30 which are controlled with respect to time and whose magnet excitation is controlled by a control unit 31. The number of solenoid valves 30 is governed by the number of injection nozzles 13. Only one solenoid valve 30 is shown in FIG. 1 corresponding to the one injection nozzle 13. There is only one high-pressure storage 28, fuel delivery pump 29 and control unit 31 regardless of the number of injection nozzles 13. The fuel delivery pump 29 is connected in turn with the fuel tank 15 via another intake line 32. The solenoid valve 30 is constructed as a 2/2-way valve 33 with spring return, wherein one of the two controlled connections is connected with the injection chamber 18 of the injection nozzle 13 and the other is connected with the high-pressure storage 28. The 2/2-way valve 33 is closed in its currentless, i.e. unexcited, passive state and interrupts the connection line 34 between the high-pressure storage 28 and injection chamber 18 of the injection nozzle 13. For the purpose of the synchronization of the control of the solenoid valve 30 with the delivery stroke of the fuel injection pump 10, the control unit 31 comprises sensors which trigger the solenoid valve 30 and which are not shown in more detail. Such a sensor can be a crank angle sensor, for example, which provides the trigger signals which are a function of the angle of rotation. However, a nozzle needle movement sensor can also be used as a sensor. By means of a corresponding time delay of the triggering of the solenoid valve 30 relative to these sensor signals in the control unit 31, the start of the advance injection and the quantity of the advance injection can be adjusted and varied within wide limits. The main injection which is carried out by means of the fuel injection pump 10 via the injection chamber 17 and the injection opening 21 is conventional and generally known.

A variant of the advance injection unit 27 in FIG. 1 is shown in FIGS. 2 to 5. Of the injection nozzle 13, only the advance injection nozzle 132 is shown. Each of the advance injection units 227–527 is conceived in turn for a four-cylinder diesel engine and can take the place of the advance injection unit 27 in FIG. 1.

Figure 2:
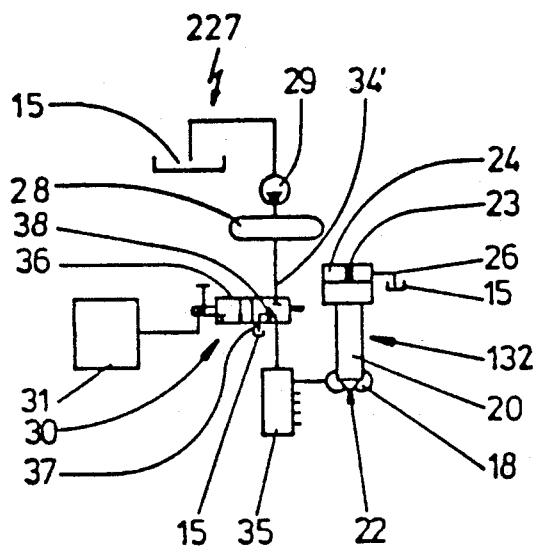
FIGS. 2 to 5 shows schematics of an advance injection unit with an advance injection nozzle of the fuel injection arrangement in FIG. 1 according to additional embodiment examples.

The advance injection unit 227 in FIG. 2 is distinguished from that in FIG. 1 in that a compulsorily controlled mechanical distributor element 35, which is connected on the output side with an injection chamber 18 of the injection nozzles 13 and on the input side with the high-pressure storage 28 via the solenoid valve 30, is provided for the four advance injection nozzles 132. The solenoid valve 30 is designed as a 3/2-way valve 36, of its three controlled connections one is connected with the output of the high-pressure storage 28, one is connected with the input of the distributor element 35, and one is connected with the fuel tank 15 via a fuel return line 37. A non-return valve 38, which can be integrated in the 3/2-way valve 36, is arranged in the fuel return line 37.

Only a single solenoid valve 30 is required in this advance injection unit 227, since the synchronous control of the four advance injection nozzles 132 is effected by means of the compulsorily controlled distributor element 35 which is driven by the diesel engine.

Figure 3:
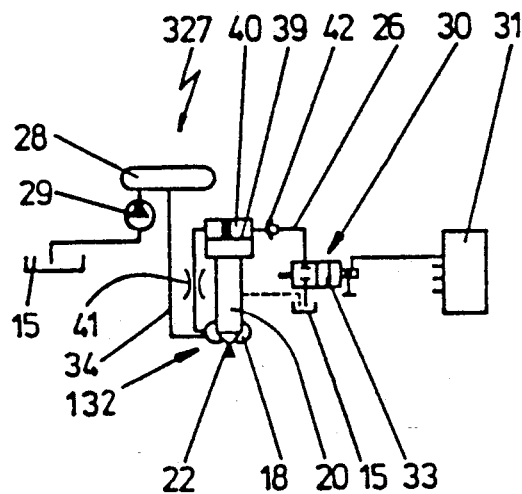
Figure 4:
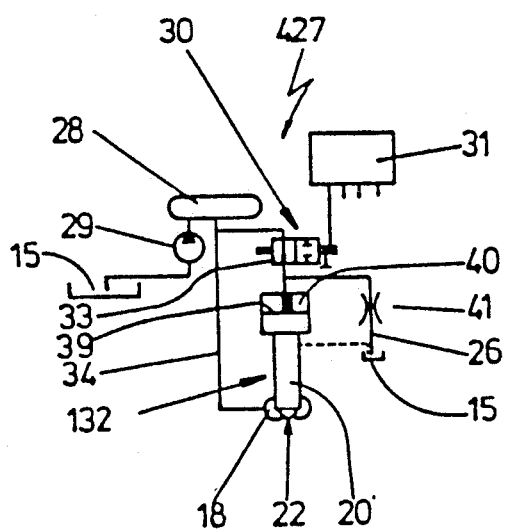
Figure 5:
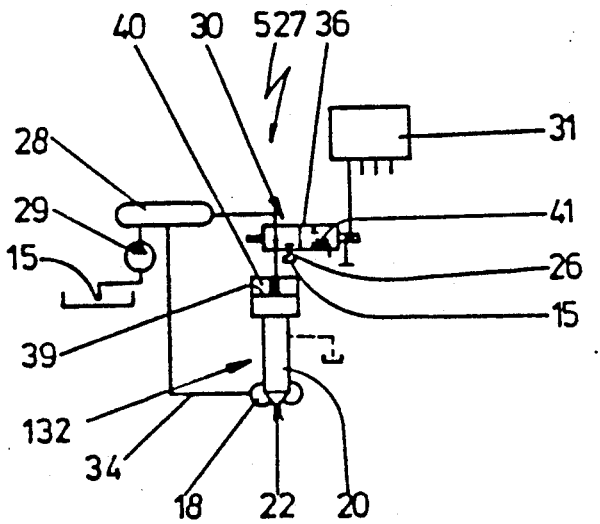

The advance injection units in FIGS. 3 to 5 require a modified manner of constructing the advance injection nozzles 132. In this case, at least the nozzle needles 20 assigned to the advance injection unit are constructed in such a way that it defines a control space 40 in the nozzle holder 16 (not shown in FIGS. 3–5) with its front face 39 which is remote of the injection opening 22. The control space 40 can be filled with fuel from the high-pressure storage 28 and can be blocked or opened, as desired, by means of the solenoid valve 30. A separate solenoid valve 30 is required in turn for each injection nozzle 13 so that there is a total of four solenoid valves 30 in a four-cylinder diesel engine. The solenoid valves 30 are triggered in turn by the control unit 31. In all of the advance injection units 327–527, each injection chamber 18 of the advance injection nozzle 132 is directly connected with the high-pressure storage 28 via the connection line 34.

In the advance injection unit 327, which is drawn in schematic form in FIG. 3, the control space 40 is connected with the high-pressure storage 28 via a throttle 41 on the one hand and with the fuel return line 26 leading to the fuel tank 15 on the other hand. The solenoid valve 30, which is again constructed as a 2/2-way valve 33 with spring return, is connected into the fuel return line 26; in its currentless state it blocks, that is, interrupts the fuel return line 26, and closes off the control space 40. A non-return valve 42 is provided in addition in the fuel return line 26 between the control space 40 and the solenoid valve 30.

In this advance injection unit 327, the pressure in the high-pressure storage 28 acts on the injection chamber 18 and, via the throttle 41, on the control space 40 and, accordingly, on the back of the nozzle needle 20. When the solenoid valve 30 is excited and controls in its opened state, the pressure in the spring space 40 is controlled via the fuel return line 26. The nozzle needle 20 accordingly opens and releases the injection opening 22.

The injection is terminated by means of switching the solenoid valve 30 again.

In the advance injection unit 427 in FIG. 4, the control space 40 is connected with the high-pressure storage 28 via the solenoid valve 30 on the one hand and with the fuel tank 15 via the fuel return line 26 on the other hand. A throttle 41 is arranged in the fuel return line 26. The solenoid valve 30 is constructed again as a 2/2-way valve 33 with spring return, which is opened in its currentless neutral position and connects the high-pressure storage 28 with the control space 40. The connection between the high-pressure storage 28 and the control space 40 of the advance injection nozzle 132 is interrupted by means of actuating the solenoid valve 30. The pressure in the control space 40 is controlled by means of the throttle 41 so that the nozzle needles 20 open under the pressure of the injection chamber 18 and releases the injection opening 22. The injection is terminated by means of switching the solenoid valve 30 back into its neutral position in which the control space 40 is again filled with fuel which is under injection pressure.

In the advance injection unit 527 in FIG. 5, the control space 40 can be connected alternately with the high-pressure storage 28 and with the fuel return line 26 leading to the fuel tank 15 by means of the solenoid valve 30 which is constructed as a 3/2-way valve 36 with spring return. One of the three controlled connections of the 3/2-way valve 36 is connected with the output of the high-pressure storage 28, the other is connected with the input of the control space 40, and the third is connected with the fuel return line 26. A throttle 41 is connected in the fuel return line 26 and is preferably integrated in the 3/2-way valve 36. In the currentless state, the solenoid valve 30 connects the control space 40 with the high-pressure storage 28. Because of the injection pressure in the control space 40, the nozzle needle 20 closes the injection opening 22. By controlling the solenoid valve 30, the control space 40 is connected with the fuel return line 26 and the high-pressure storage 28 is blocked. The pressure in the control space 40 is controlled, and the nozzle needle 20 releases the injection opening 22. The advance injection unit 527 works in the same way as the advance injection unit 427 in FIG. 4, but avoids the instability of the advance injection unit 427 because of the pressure drop which is constantly present via the throttle 41.

We claim:

1. Fuel injection arrangement for internal combustion engines, particularly for diesel engines, comprising a plurality of injection nozzles for injection of a quantity of fuel to each of a plurality of combustion cylinders of an internal combustion engine, which fuel quantity is divided into a proportioned advance injection quantity and a subsequently injectable proportioned main injection quantity, at least one of said injection nozzles being respectively assigned to one of said cylinders of the internal combustion engine, a high-pressure fuel storage held at injection pressure level by means of a high-pressure fuel supply pump and further being connectable in turn via a time controlled solenoid valve (30) to said injection valves for injection of said proportioned advance injection quantity and a separately driven high-pressure fuel injection pump for injection of said proportioned subsequent main injection quantity.

2. Arrangement according to claim 1, characterized in that each injection nozzle (13) comprises smaller and larger injection cross sections (21,22), the smaller being assigned to the advance injection unit (27;227;327;427;527) and the larger being assigned to the fuel injection pump (10).

3. Arrangement according to claim 2, characterized in that each injection nozzle (13) comprises a nozzle holder (16) with two injection chambers (17,18), one of which is connected with the high-pressure storage (28), while the other is connected with the fuel injection pump (10); in that the injection cross sections are formed by injection openings (21,22) of the injection chambers (17,18), each of which is controlled by a nozzle needle (19,20), and in that the nozzle needles (19,20) are acted upon by injection pressure in the injection chambers (17,18) in an injection opening direction.

4. Arrangement according to claim 3, characterized in that the nozzle needles (19,20) are each loaded by means of a closing spring (23) in an injection closing direction, and in that the solenoid valve (30) is arranged in a connection line (34) between the high-pressure storage (28) and the injection chamber (18) assigned to the advance injection unit (27,227).

5. Arrangement according to claim 4, characterized in that in the case of a plurality of injection nozzles (13) the solenoid valve (30) is connected in each of connection lines (34) leading from the high-pressure storage (28) to the injection chambers (18), and in that the solenoid valves (30) are constructed as 2/2-way valves (33) which preferably block in currentless state.

6. Arrangement according to claim 4, characterized in that in the case of a plurality of injection nozzles (13), a compulsorily controlled distributor element (35) is provided which is connected with the high-pressure storage (28) on the input side and with each of the injection chambers (18) assigned to the advance injection unit (227) on the output side; and in that the solenoid valve (30) is arranged between the high-pressure storage (28) and the distributor element (35) and is constructed as a 3/2-way valve (36) whose third controlled connection is connected with a fuel return line (37).

7. Arrangement according to claim 3, characterized in that at least the nozzle needle (20) assigned to the advance injection unit (327;427;527) defines a control space (40) with its front face (39) remote of the injection opening (22), which control space (40) can be filled from the high-pressure storage (28) and can be blocked or released by means of the solenoid valve (30).

8. Arrangement according to claim 7, characterized in that the control space (40) is connected with the high-pressure storage (28) via a throttle (41) on the one hand and with a fuel return line (26) via the solenoid valve (30) on the other hand, and in that the solenoid valve (30) is constructed as a 2/2-way valve (33) which preferably blocks in its currentless state.

9. Arrangement according to claim 7, characterized in that the control space (40) is connected on the one hand with a fuel return line (26) via a throttle (41) and, on the other hand, with the high-pressure storage (28) via the solenoid valve (30), and in that the solenoid valve (30) is constructed as a 2/2-way valve (33) which is preferably open in its currentless neutral position.

10. Arrangement according to claim 7, characterized in that the control space (40) is alternately connected with the high-pressure storage (28) and with a fuel return line (26) via the solenoid valve (30), and in that the solenoid valve (30) is constructed as a 3/2-way valve (36), one of its three controlled connections being connected with the control space (40), the second with the high-pressure storage (28) and a third being connected with the fuel return line (26) via a throttle (41).

11. Arrangement according to one of claims 7-10, characterized in that a separate solenoid valve (30) is assigned to each control space (40) when there is a plurality of injection nozzles (13).

12. Arrangement according to claim 11, characterized in that an electric control unit (31) for controlling the separate valves (30) is provided.

13. Arrangement according to claim 12, characterized in that the advance injection unit (27;227;327;427;527) comprises a fuel delivery pump (29) for supplying the storage pressure of the high-pressure storage (28), the fuel delivery pump (29) being connected with a fuel tank (15).

* * * * *